US012111632B1

(12) United States Patent
Bansal

(10) Patent No.: US 12,111,632 B1
(45) Date of Patent: *Oct. 8, 2024

(54) EDGE DEVICE ARCHITECTURE WITHIN LOGISTICS CENTER FOR INCREASING THROUGHPUT

(71) Applicant: Amazon Technologies, Inc., Seattle, WA (US)

(72) Inventor: Rohit Bansal, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 973 days.

This patent is subject to a terminal disclaimer.

(21) Appl. No.: 17/116,079

(22) Filed: Dec. 9, 2020

(51) Int. Cl.
| G05B 19/4155 | (2006.01) |
| B25J 9/16 | (2006.01) |
| B65G 1/137 | (2006.01) |
| G06Q 10/087 | (2023.01) |

(52) U.S. Cl.
CPC ........ G05B 19/4155 (2013.01); B25J 9/1661 (2013.01); B25J 9/1682 (2013.01); B65G 1/1373 (2013.01); G06Q 10/087 (2013.01); G05B 2219/40269 (2013.01)

(58) Field of Classification Search
CPC ....... G05B 19/4155; G05B 2219/40269; B25J 9/1661; B25J 9/1682; B65G 1/1373; G06Q 10/087
USPC .......................................................... 700/28
See application file for complete search history.

(56) References Cited

U.S. PATENT DOCUMENTS

| 2017/0282362 | A1* | 10/2017 | Erhart .................... B25J 11/008 |
| 2017/0336780 | A1* | 11/2017 | Wise .................... G06Q 10/087 |
| 2019/0049975 | A1* | 2/2019 | Kattepur .............. G05D 1/0217 |
| 2020/0094402 | A1* | 3/2020 | Carlberg .................. B25J 9/163 |
| 2020/0316786 | A1* | 10/2020 | Galluzzo ................. B25J 9/162 |
| 2022/0187847 | A1* | 6/2022 | Cella ....................... G06Q 50/40 |
| 2023/0271785 | A1* | 8/2023 | Gravelle ............. G06Q 10/087 |
| | | | 700/216 |

OTHER PUBLICATIONS

Kumar, et al. "Design and development of an automatic robotic Pick and stow—warehouse" arXiv, Mar. 7, 2017 (Year: 2017).*

* cited by examiner

Primary Examiner — Md Azad
(74) Attorney, Agent, or Firm — Lee & Hayes, P.C.

(57) ABSTRACT

A local device may receive, from a remote device, a task to be completed at a workstation within a logistics center in which orders are fulfilled and processed. The local device may determine, among a plurality of robotic agents at the workstation, a robotic agent configured to perform the task. An in-memory datastore having cache and compute capabilities may be stored in memory of the local device may store data associated with the task and the robotic agent to complete the task. The local device may instruct the robotic agent to perform the task and may receive, from the robotic agent, an indication associated with the performance of the task. This data may be stored in the in-memory datastore and/or may be used for assigning future tasks.

20 Claims, 7 Drawing Sheets

EDGE DEVICE ARCHITECTURE WITHIN LOGISTICS CENTER FOR INCREASING THROUGHPUT

BACKGROUND

The development of e-commerce has brought about an increase in order fulfillment, shipment, and distribution. To handle this increase, warehouses, distribution centers, or facilities often utilize systems of robotic agents to perform various tasks. For example, robotic agents may pick item(s) for fulfilling orders, re-stock item(s), induct item(s) or packages for shipment, sort item(s), and so forth. Oftentimes, computing resource(s) located remotely from the facility coordinate performance of the tasks within the facilities. In such instances, the robotic agent(s) may be in communication with the computing resource(s) either directly or indirectly (e.g., via a computing device). However, existing platforms or services have limited throughput and/or stateful memory. This results in slowed processes, dropped task(s), and/or decreased operational performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
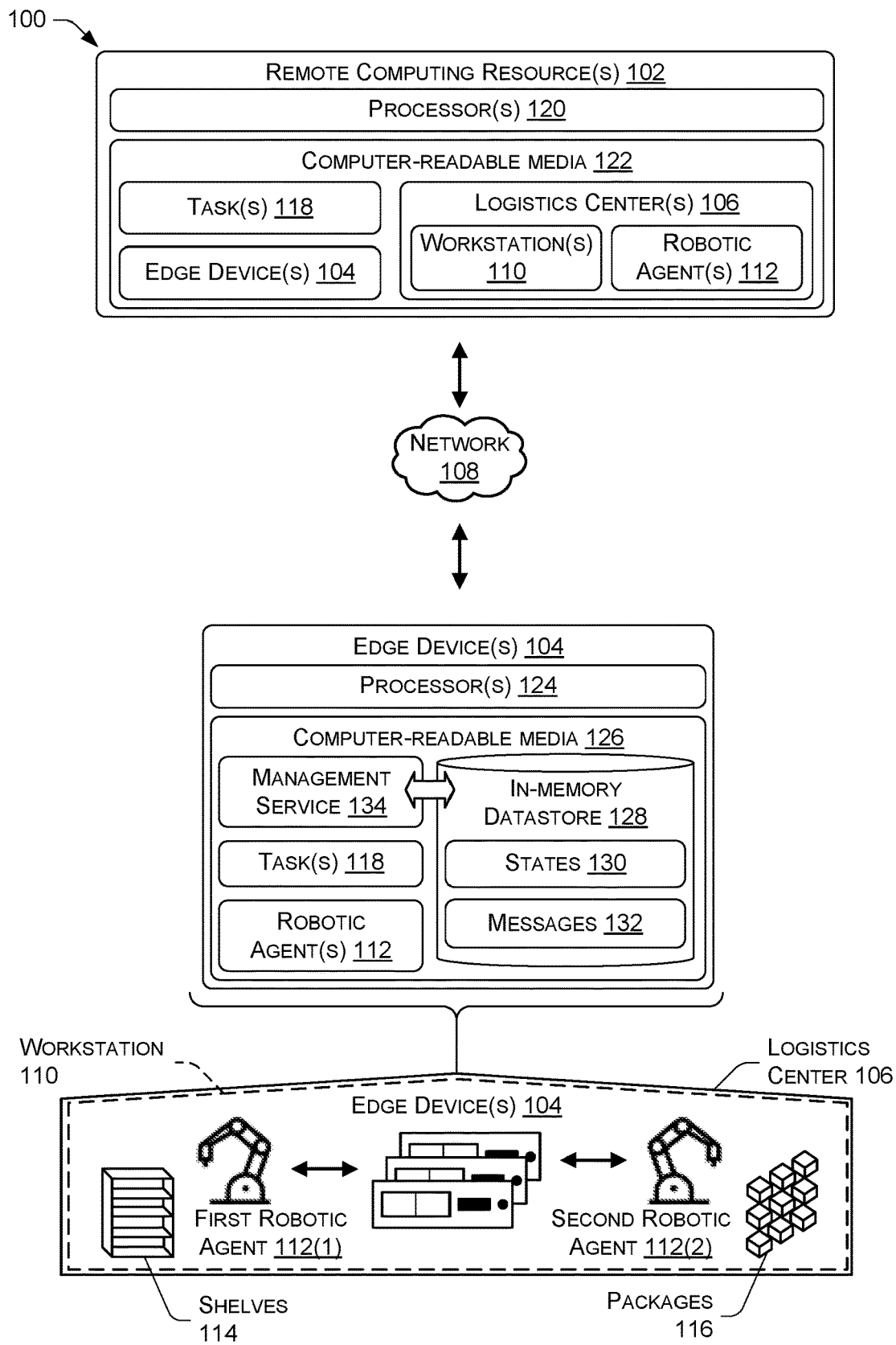
FIG. 1 illustrates an example environment for increasing throughput between one or more edge device(s) and remote computing resource(s). In some instances, the one or more edge device(s) may be located within a logistics center where item(s) are sorted, packaged, or inducted for shipment. The one or more edge device(s) may include a management service to instruct or otherwise coordinate performance of task(s) within the logistics center by robotic agents. The one or more edge device(s) may also maintain an in-memory datastore in communication with the management service for storing information associated with the tasks.

Described herein are, among other things, systems and methods for increasing throughput between edge computing resource(s) and remote computing resource(s) within a logistics center where item(s) (e.g., apparel, books, etc.) are stored, packaged, and/or shipped. In some instances, the edge computing resource(s) may be physically placed or located within the logistics center and may include a management service (e.g., application) that instructs robotic agent(s) (e.g., robotic arms, tote movers, shuttles, pallet jacks, gantries, etc.) to perform a variety of task(s) (e.g., sort, place, pick, package, etc.) associated with fulfilling order(s). As part of this process, the management service may receive commands from the remote computing resource(s), or an application executing on the remote computing resource(s), and instruct the robotic agent(s) to carry out the task(s). The edge computing resource(s) may also maintain an in-memory datastore (e.g., remote dictionary (Redis) server, Apache Ignite, Couchbase Server, etc.) having cache and compute capabilities. The in-memory datastore may include or store information associated with state(s) of the robotic agent(s), previous task(s) performed, current task(s) being performed, and/or information associated with the task(s) (e.g., time completed, time started, etc.). Additionally, the in-memory datastore may include capabilities for responding to request(s) about state(s) of the task(s) and/or the robotic agent(s). Maintaining the in-memory datastore at the edge computing resource(s) may increase a throughput between the edge computing resource(s) and the remote computing resource(s). This allows the edge computing resource(s), or the management service, to receive more task(s), reduce latency, and/or increase an operational performance of the logistics center.

In some instances, the edge computing resource(s) may represent a device or system (e.g., servers, routers, integrated access devices (IADs), etc.) in communication with the remote computing resource(s) (e.g., cloud services, data centers, etc.). The remote computing resource(s) may generate task(s) to be performed within the logistics center. For example, the remote computing resource(s) may generate task(s) for work to be completed within the logistics center. Noted above, in some instances, these task(s) may be associated with fulfilling or preparing order(s) for shipment, restocking item(s), and so forth. The remote computing resource(s) may select or otherwise determine workstations that are to complete the task(s). The workstation(s) may be associated with respective robotic agent(s) and that carry out the task(s). In this sense, the workstation(s) may be different, or include different task(s) they are configured to perform (e.g., packing, picking, restocking, etc.). At the work station(s), the edge computing resource(s) may determine robotic agent(s) to complete the task. For example, the edge computing resource(s) at a workstation may receive a task from the remote computing resource(s) and the edge computing resource(s) may then select a best-suited robotic agent at the workstation for performing the task.

In some instances, initially, the remote computing resource(s) may select a workstation to perform the task based on a characterization or type of task to be performed. For example, as the logistics center may include a plurality of robotic agent(s), the remote computing resource(s) may determine capabilities of each workstation for assigning the task(s). The remote computing resource(s) may also select a workstation based on a location of the workstation within the logistics center, capabilities of the robotic agent(s) at the workstation, a status of the workstation and/or robotic agent(s) (e.g., online, offline, etc.), a workload of the workstation and/or robotic agent, and so forth. By way of example, if the task is associated with restocking item(s), the remote computing resource(s) may select a workstation associated with restocking item(s), as compared to a workstation associated with packing item(s).

The logistics center may include any number of edge computing resource(s) in communication with the remote computing resource(s) (e.g., one, two, five, etc.). Each of the edge computing resource(s) may be associated with a workstation within the logistics center and control, or be in communication with, the robotic agent(s). In some instances, the edge computing resource(s) may be in communication with any number of robotic agent(s) (e.g., four). For example, the logistics center may include a first workstation for restocking item(s), a second workstation for packing item(s), and a third workstation for inducting completed order(s). The first workstation may include first edge computing resource(s) for controlling first robotic agent(s) at the first workstation, the second workstation may include second edge computing resource(s) for controlling second robotic agent(s) at the second workstation, and the third workstation may include third edge computing resource(s) for controlling third robotic agent(s) at the third workstation. However, the logistics center may include any number of edge computing resource(s) associated with respective workstations and robotic agent(s).

Upon selection of the workstation to complete the task, the remote computing resource(s) may communicate with respective edge computing resource(s). In receipt of the task, the edge computing resource(s) at the workstation may select a robotic agent for carrying out the task. In some instances, the edge computing resource(s) may have access to information about a status or state of the robotic agent(s) for carrying out performance of the task or otherwise instructing the robotic agent.

To carry out the performance of the task and to instruct the robotic agent(s), the edge computing resource(s) may include or maintain the management service. Generally, the management service may represent software or an application installed on the edge computing resource(s) that performs local computing and management of the robotic agent(s). The management service may also act as a message platform for communication with the robotic agent(s) and the remote computing resource(s). For example, the management service may receive the task(s) from the remote computing resource(s), coordinate the assignment of task(s) to the robotic agent(s), translate the task(s) into language understood by the robotic agent(s), monitor a status of the robotic agent(s) or the completion of the task(s), and so forth. In some instances, the management service may transmit information (e.g., status, performance, etc.) associated with the task(s), robotic agent(s), or workstation back to the remote computing resource(s) for processing and/or the future assignment of task(s) 118.

Given the number of task(s) performable across the robotic agent(s), as well as the number of robotic agent(s) in communication with the edge computing resource(s), communications between the remote computing resource(s) and the edge computing resource(s) demand sufficient throughput. That is, at any given time, the edge computing resource(s) may receive task(s) to be completed at the workstation, may perform read/write functions, may transmit data to the remote computing resource(s) regarding a performance of the task(s), and/or may respond to request regarding an operation or current status of the workstation. Additional communications, however, are also contemplated (e.g., debugging reports, sensor data, etc.). Conventional system(s) utilize shared shadows, or shared copies, between edge computing resource(s) and remote computing resource(s). This allows the edge computing resource(s) and the remote computing resource(s) to determine a status of the workstation for use in assigning task(s). However, shared shadows often have size limits (e.g., memory) and restraints on transaction throughput. For example, shared shadows may have a limit of twenty transactions per second. As a result, operational performance within conventional logistics centers may be less than optimal. For example, during peak hours or when communications exceed twenty transactions per second, task(s) may be dropped or the workstation may stop functioning (i.e., crash).

Comparatively, the edge computing resource(s) may maintain or store, in memory, an in-memory datastore in communication with the management service. The management service and the in-memory datastore server may be configured to operate alongside one another for increasing a throughput between the edge computing resource(s) and the remote computing resource(s). For example, status information associated with the robotic agent(s), the task(s), and/or the workstation may be stored on the in-memory datastore. Noted above, this is in comparison to conventional methods that transmit such information to the remote computing resource(s), or which simply do not store such information. In the former instance, this reduces a throughput between the edge computing resource(s) and the remote computing resource(s). In the latter instance, failing to store the information does not provide the ability to problem solve or debug issues or problems experienced at the workstation(s).

The in-memory datastore may be implemented as an in-memory data cache, and may be a separate platform, application, or service than the management service operating on the edge computing resource(s). The in-memory datastore may also have compute capabilities, for example, read and write capabilities, to store information and process requests for accessing stored information. The in-memory datastore may also be shared across the edge computing resource(s) at the workstation and include atomic update capabilities such that the edge computing resource(s) each receive up-to-date and consistent information. In other words, the atomic updates may ensure that the edge computing resource(s) at a workstation have access to the same data.

Further, maintaining the in-memory datastore on the edge computing resource(s) also allows workstation(s) to implement additional robotic agent(s). For example, because the in-memory datastore increases a throughput between the edge computing resource(s) and the remote computing resource(s), the edge computing resource(s) may handle increased communications for task(s). This, in some instances, allows the workstation(s) to scale by having more robotic agent(s) assigned to the workstation (or other agent(s)) for performing the task(s) and/or allows a greater number of task(s) to be performed and monitored at the workstation.

In some instances, the information stored in the in-memory datastore may include state(s) of the robotic agent(s) (e.g., enabled, disabled, online, offline, etc.), state(s) of shelves or other storage unit(s) within the logistics center (e.g., empty, filled, etc.), when task(s) were received, when task(s) were completed, message(s) between the edge computing resource(s) and the robotic agent(s), such as commands, responses, etc., and/or sensor data collected by sensor(s) of the robotic agent(s) and/or throughout the logistics center. This information may be stored for use in optimizing performance, resolving conflicts, machine learning (ML) purposes, artificial intelligence (AI) purposes, and so forth.

In some instances, the information stored in the in-memory datastore may be communicated to the remote computing resource(s) upon request for debugging purposes or resolving problems within the sortation center. Additionally, the management service may be subscribed to updates through, or receive updates from, the in-memory datastore. For example, when updates are made to the in-memory datastore, such as status of a robotic agent, this information may be made available to the management service. The status or state of a robotic agent, or the status of a slot or position on a shelf, may be used for coordinating the future assignment of task(s). Storing the in-memory datastore locally at the edge computing resource(s) allows for the edge computing resource(s), or the management service, to act locally on the data generated by the robotic agent(s), respond to state(s), and/or control other devices (e.g., internet of things (IoT), and reduce latencies associated with remote communication. However, the edge computing resource(s) may utilize the remote computing resource(s) for more advanced data processing, cloud for management, analytics, and storage.

To briefly illustrate, consider a scenario in which the remote computing resource(s) transmits an instruction to an edge computing resource(s) at a workstation associated with a robotic agent moving a tote (e.g., bin, container, tray, etc.) from one location to another within the logistics center. This instruction may be received by a message broker of the management service, may be stored in the in-memory datastore, and the management service may coordinate the assignment of the task(s) to the robotic agent. As part of this process, the management service may translate the task(s) into a language understood by the robotic agent and may then write the task to the robotic agent. The robotic agent may then attempt or cause the task to be completed. Upon completion, the management service may receive an indication of such and store the completion of the task, and details associated therewith, to the in-memory datastore. The robotic agent may then be assigned an additional task for completion. The data stored in the in-memory datastore may indicate a time tasks were started, completed, etc., instructions transmitted to the robotic agent, responses from the robotic agent, task identifiers, and so forth. Storing this information locally allows for the edge computing resource(s) to act on the states or the states of the robotic agent.

Throughout the course of the robotic agent performing the tasks, or during a completion of the task, personnel (e.g., operators, associates, etc.) may inquire about the status of the task and/or the robotic agent. For example, problems may arise and the robotic agent may be unable to complete the task and/or experience issues in completing the task. Conventionally, this information is unavailable given the size limits of shared shadows and/or this information is sent to the remote computing resource(s). In the latter instance, such conventional communications may overwhelm the communication between the remote computing resource(s) and the edge computing resource(s), leading to dropped task(s) or suboptimal performance. Utilizing the in-memory datastore, however, offers this information available upon request. In receipt, the personnel may diagnose problems at the workstation for increasing throughput and optimal performance within the logistics center.

Although the present disclosure is discussed in reference to a logistics center, it is to be understood that the systems and methods discussed herein may find use in other environments, such as households, hospitals, schools, business, manufacturing facilities, etc. For example, the edge computing resource(s) having the in-memory datastore may be used in various environments employing IoTs for reducing latency, increasing throughput between edge computing resource(s) and remote computing resource(s), and increasing a bandwidth of task(s). In some instances, the edge computing resource(s) (or edge servers) may be communicatively coupled to various devices within an IoT network, such as appliances, televisions, routers, mobile devices, vehicles, instruments, industrial equipment, sensors, medical devices, etc. Additionally, although the discussion relates to utilizing robotic agent(s), the management service or other like services may communicate with human agents via devices for performing tasks.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 showing remote computing resource(s) 102, an edge device(s) 104, and a logistics center 106. In some instances, the remote computing resource(s) 102 may be located remotely from the edge device(s) 104, which in some instances, may physically reside within the logistics center 106. The remote computing resource(s) 102 and the edge device(s) 104 may communicatively couple to one another via a network 108. The network 108 may represent any type of communication network, including a data network, and may be implemented using wired infrastructure (e.g., cable, CAT5, fiber optic cable, etc.), a wireless infrastructure (e.g., RF, cellular, microwave, satellite, Bluetooth, etc.), and/or other connection protocols.

In some instances, the logistics center 106 may represent an order fulfillment center or facility in which orders are sorted or otherwise fulfilled, processed, and/or categorized for shipment. In some instances, the logistics center 106 may include inventory. Generally, the inventory stores an inventory of items (e.g., clothing, electronics, toys, household goods, etc.). In some instances, the items may be stored in bins, slots, shelves, containers, crates, stalls, racks, etc. In some instances, the inventory may be dispersed about the logistics center 106, may be located on moveable platform(s) throughout the logistics center 106, or may be located in dedicated areas of the logistics center 106 (e.g., perimeter). Additionally, or alternatively, in some instances, the inventory may be located separate from the logistics center 106. Furthermore, in some instances, the logistics center 106 may not include the inventory, such as in a sortation center or cross-docking station. Here, the logistics center 106 may receive previously packaged items for further sortation and/or delivery to a variety of destinations.

The logistics center 106, or the environment 100, may include a plurality of workstation(s) 110 associated with fulfilling order(s), such as picking stations, packing stations, ejection sites, and/or stow stations. These workstation(s) 110 may be mobile (e.g., robot guided) and/or stationary within the logistics center 106. At the picking stations, item(s) of the inventory may be picked (e.g., collected), assigned to be picked, organized, managed, and/or grouped. Once picked, the item(s) may be transferred to the packing stations where the item(s) are packaged into packages (e.g., boxes, bags, envelopes, etc.). After packing, the item(s) may travel to the ejection sites, or induct stations, where the packages are inducted for shipment to the customer or other facilities. In some instances, the logistics center 106 may include chutes, conveyors, belts, rollers, robotic carriers, or other mechanisms for transferring the item(s) between the picking stations, the packing stations, and/or the ejection sites. Moreover, in some instances, the logistics center 106 may include stations for restocking item(s). For example, item(s) may be restocked into shelves, bins, containers for picking and shipment at later instances.

Robotic agent(s) 112 may perform a variety of tasks at the workstation(s) 110 and/or within the logistics center 106. For example, the logistics center 106 is shown including a first robotic agent 112(1) and a second robotic agent 112(2). As illustrated, the first robotic agent 112(1) and the second robotic agent 112(2) may include articulating arms having end effectors for picking item(s), transferring item(s), grasping item(s), moving containers, etc. For example, the first robotic agent 112(1) may be utilized for picking item(s) or container(s) (e.g., totes, bins, trays, etc.) off of shelves 114, placing the item(s) into the containers, placing container(s) onto the shelves 114, and so forth. The second robotic agent 112(2) may be utilized for placing item(s) into package(s) 116, or otherwise packing item(s) for shipment. However, although FIG. 1 or the logistics center 106 is shown including two robotic agents 112, the logistics center 106 may include more than, or less than, two robotic agents 112. Additionally, the logistics center 106 may include different robotic agents 112 than shown. For example, the robotic agent(s) 112 may include drives, conveyor belts, lifts, jacks, actuators, platforms, payload carriers, trailers, and so forth. As such, the robotic agent(s) 112 may include different capabilities that are dictated by the hardware or components of the robotic agents 112. In some instances, additionally or alternatively, the logistics center 106 may have human agent(s) that work alongside the robotic agent(s) 112.

The remote computing resource(s) 102 may coordinate performance of task(s) 118 within the logistics center 106 or across a plurality of other logistics centers. As shown, the remote computing resource(s) 102 may include processor(s) 120 and computer-readable media 122, where the processor(s) 120 may perform various functions and operations associated with assigning the task(s) 118 and the computer-readable media 122 may store instructions executable by the processor(s) 120 to perform the operations described herein. In some examples, the edge device(s) 104 may utilize the remote computing resource(s) 102 for processing (e.g., assigning the task(s) 118) given that the remote computing resource(s) 102 may have a computational capacity that far exceeds the computational capacity of the edge device(s) 104. However, the edge device(s) 104 include computational capacities for receiving task(s) 118 and causing execution of those task(s) 118 within the logistics center 106 and at the workstation(s) 110.

In some instances, the task(s) 118 may represent work, jobs, actions, duties, assignments, or commands to be performed within the logistics center 106. For example, the task(s) 118 may include commands related to moving totes to the picking stations to permit the robotic agent(s) to pick item(s) from the inventory, moving totes from packing stations after the item(s) are packaged, moving pallets, moving carts, picking ordered items from the inventory (e.g., quantity, location, pick order, etc.), bringing picked item(s) to stations for packing or preparation for shipment, moving packaged item(s)/orders to the ejection stations (e.g., loading dock, shipping platforms, pallets, delivery truck, delivery trailer, etc.), unloading inventory, stowing the inventory (e.g., from pallet or case-sized groups to individual inventory items), counting the inventory, picking up objects, transporting objects, dropping off objects, and so forth. However, it is to be understood that the task(s) 118 may relate to other operations performed in the logistics center 106 by the robotic agent(s) 112 and/or human agent(s).

In some instances, the remote computing resource(s) 102 may generate the task(s) 118. In some instances, the remote computing resource(s) 102 may receive requests for tasks 118 to be generated. Therein, the remote computing resource(s) 102 may communicate with the edge device(s) 104 for causing the performance of the task(s) 118. Upon generating a task to be performed, the remote computing resource(s) 102 may determine an appropriate robotic agent 112 and/or the workstation 110 to perform the task 118. The remote computing resource(s) 102 may then communicate the task 118 to respective edge device(s) 104. For example, remote computing resource(s) 102 may select a robotic agent 112 or a workstation 110 for performing the task 118 based on capabilities of the robotic agent 112 (e.g., lifting capacity, type, etc.), robotic agent(s) 112 at the workstation 110, a location with the logistics center 106, an availability of the robotic agent 112, and so forth.

In some instances, the logistics center 106 may include any number of workstation(s) 110, where each of the workstation(s) 110 may be associated with one or more edge device(s) 104. For example, edge device(s) 104 may be provisioned separately across the workstation(s) 110 within the logistics center 106. The computer-readable media 122 of the remote computing resource(s) 102 may therefore store, or have access to, information of those edge device(s) 104 provisioned at the workstation(s) 110 within the logistics center 106, as well as those robotic agent(s) 112 controlled by the respective edge device(s) 104 across the workstation(s) 110. In such instances, an indication of the robotic agent(s) 112 may be stored in association with respective edge device(s) 104 and/or the workstation(s) 110.

The edge device(s) 104 may act as an interface between the remote computing resource(s) 102 and the robotic agent(s) 112 for coordinating the task(s) 118. In some instances, the edge device(s) 104 may represent industrial personal computer (IPC) that allows for processes (or applications) on the edge device(s) 104 to communicate with one another and coordinate actions. In some instances, the logistics center 106 may include a plurality of edge device(s) 104, where individual edge device(s) 104 may be communicatively coupled to robotic agent(s) 112. As such, the logistics center 106 may include more than one edge device(s) 104, and/or each edge device(s) 104 may be in communication with respective robotic agent(s) 112.

The edge device(s) 104 may control, or communicate with, respective robotic agent(s) 112 at a particular workstation 110. For example, the logistics center 106 may include first edge device(s) 104 having access to a first plurality of robotic agent(s) 112, and second edge device(s) 104 having access to a second plurality of robotic agent(s) 112. The first plurality of robotic agent(s) 112 may be configured to perform a variety of first task(s) and the second plurality of robotic agent(s) 112 may be configured to perform a variety of second task(s). In such instances, the remote computing resource(s) 102 may store the robotic agent(s) 112 in association with the edge device(s) 104, the workstation 110, and/or the logistics center 106 for assigning the task(s) 118.

The edge device(s) 104 is shown including a management service 134 for instructing or otherwise causing the robotic agent(s) 112 to perform task(s) 118. The edge device(s) 104 may be in communication with the robotic agent(s) 112 via wired or wireless protocols, or over a local area network (LAN). As shown, the edge device(s) 104 may include processor(s) 124 and computer-readable media 126, where the processor(s) 124 may perform various functions and operations associated with coordinating the task(s) 118 and the computer-readable media 126 may store instructions executable by the processor(s) 124 to perform the operations described herein.

In some instances, the management service 134 may represent software or an application installed on the edge device(s) 104 that performs local computing and management of the robotic agent(s) 112 and the performance of the task(s) 118. For example, the management service 134 may receive the task(s) 118 from the remote computing resource(s) 102, coordinate the assignment of task(s) 118 with the robotic agent(s) 112, translate the task(s) 118 into a language understood by the robotic agent(s) 112 (or PLCs thereof), monitor a status of the robotic agent(s) 112 or the completion of the task(s) 118, and so forth. As part of this process, the management service 134 may also transmit information (e.g., status, performance, etc.) back to the remote computing resource(s) 102.

The edge device(s) 104 also maintain an in-memory datastore 128 (e.g., Redis server, Apache Ignite, etc.) in communication with the management service 134. As shown, the in-memory datastore 128 may be separate from the management service 134 operating on the edge device(s) 104. The management service 134 and the in-memory datastore 128 may be configured to operate alongside one another to allow for increased throughput between the remote computing resource(s) 102 and the edge device(s) 104. In some instances, the management service 134 and the in-memory datastore 128 may communicate using Java Client. The in-memory datastore 128 may represent an open source, in-memory data structure store, that is used as a database, cache, and/or message broker. The in-memory datastore 128 may also have compute capabilities for processing and handling requests (e.g., read and write). In some instances, the in-memory datastore 128 may support multiple types of data structures, such as strings (e.g., text or binary data), hashes (e.g., a data structure for storing a list of fields and values), lists (e.g., collection of strings in the order they were added), sets (e.g., an unordered collection of strings with the ability to intersect and union), sorted sets with range queries (e.g., sets ordered by a value), bitmaps (e.g., a data type that offers bit level operations), and so forth. In addition to providing versatile data structures, the in-memory datastore 128 features high availability, geospatial, Lua scripting, transactions (e.g., read, writes, etc.), on-disk persistence, and cluster support to make it simpler to build real-time application(s). Storing the in-memory datastore 128 locally at the edge device(s) 104 eliminates the need to access disks to avoid time delays and may access data in microseconds. As such, latencies experienced at the edge device(s) 104 may be reduced and a communication bandwidth between the remote computing resource(s) 102 and the edge device(s) 104 may increase.

Moreover, in instances where more than one edge device 104 is included at the workstation 110, the in-memory datastore 128 may be shared across the edge device(s) 104. The in-memory datastore 128 may have atomic transactions to ensure that data stored in the in-memory datastore 128 is up-to-date, complete, and that the edge device(s) 104 all have access to the same data.

As shown, the in-memory datastore 128 may store, or otherwise have access to, states 130 and messages 132. Maintaining the in-memory datastore 128 at the edge device(s) 104 allows for data within the in-memory datastore 128 to be updated quickly, especially for fast changing states 130 or statuses of the task(s) 118 and the robotic agent(s) 112. In some instances, the states 130 may represent or be associated with the robotic agent(s) 112 and/or the logistics center 106, such as inventory. For example, the states 130 may represent a current state, condition, status, or mode of the robotic agent(s) 112 (e.g., busy, ready, under maintenance, off-line, on-line, etc.). Additionally, in instances where the inventory is stored on the shelves 114, the states 130 may indicate a current utilization of the shelves 114, or a slot on the shelves 114. For example, containers may be placed within slots, classified by a row and a column of the shelf), and the state 130 may indicate whether the slot is occupied by a container, empty, held, and so forth. The states 130 may also indicate a progress of the task(s) 118 (e.g., completed, failed, etc.), a completion rate or performance of the task(s) 118, and so forth. For example, the desired state may be for a container to be located at certain position on the shelf 114, but what is actually reported by the robotic agent(s) 112 after completion of the task 118 may be different. Both of these states 130 (i.e., desired and reported) may be stored in the in-memory datastore 128 for problem solving or increasing optimization. The states 130 may also include information about robot arms of the robotic agent(s) 112 (e.g., extended, retracted, position, etc.), modes of the robotic arm (e.g., pick, place, grab, etc.), alarms at the workstation(s) 110 and/or robotic agent(s) 112, metric data, sensor data, and so forth.

The edge device(s) 104 may have access to information that is specific to the workstation within the logistics center 106 for carrying out the task(s) 118. For example, the remote computing resource(s) 102 may instruct or other command the workstations, via the edge device(s) 104, to perform certain tasks 118 and the edge device(s) 104 may coordinate and execute the task(s) 118 given information about the states 130 of the robotic agent(s) 112. In some instances, this information about the states 130, or status, may not be available to the remote computing resource(s) 102 for carrying out the task(s) 118 or assigning the tasks to a particular robotic agent 112. Therefore, the management service 134 may utilize information stored in the in-memory datastore 128 for performing the tasks 118.

The messages 132, meanwhile, may be associated with or correspond to communication(s), indications, instructions, etc. transmitted between the management service 134 (or the edge device(s) 104) and the robotic agent(s) 112. The messages 132 may indicate, in some instances, commands to be performed (e.g., pick, eject, replenish, etc.), command identifiers, container identifiers, shelf identifiers (e.g., column identification/number and/or row identification/number), destinations of the robotic agent(s) 112, etc. In some instances, the container identifiers or the shelf identifiers may be associated with order(s) being fulfilled or processed for consumers. Statuses of the robotic agent(s) 112 and the task(s) 118, as well as states 130 of the robotic agent(s) 112 and the task(s) 118, or updates to the states 130, may be transmitted as messages 132. That is, task(s) 118, for example may be sent and received as messages 132. Additionally, the messages 132 may be used for deciphering or providing insight into the task(s) 118. For example, as part of the robotic agent(s) 112 completing a task, the robotic agent 112 may transmit a message to the management service 134 indicating such. The messages 132 may be used to indicate whether task(s) 118 are active, queued, in-flight, completed, received, and so forth.

Storing the messages 132 provides insight into the communications between the management service 134 and the robotic agent(s) for optimizing performance, debugging, and/or resolving conflicts when issues arise. For example, throughout the course of the robotic agent(s) 112 performing the task(s) 118, personnel (e.g., operators, associates, etc.) may inquire about the status of the task(s) 118 and/or the robotic agent(s) 112. By way of example, the first robotic agent 112(1) may be unable to locate a container on the shelf 114, may pick up another container instead, and so forth. Utilizing the in-memory datastore 128 offers this information available upon request. For example, the personnel may transmit a request to the management service 134 to supply messages 132 between the management service 134 and the first robotic agent 112(1). The messages 132 may indicate the instructions received by the first robotic agent 112(1) and/or the actions performed by the first robotic agent 112(1), for determining why the first robotic agent 112(1) picked up the wrong container. These messages 132 may be populated with time stamps, action identifiers, robotic agent identifiers, and so for, for resolving conflicts. Such information may therefore provide the personnel with the ability to diagnose problem(s) for increasing throughput.

The in-memory datastore 128 allows for the edge device(s) 104, or the management service 134, to act locally on the data generated by the robotic agent(s) 112 and/or other devices within the logistics center 106. As part of this process, the logistics center 106 may include camera(s) and/or other sensor(s) that track a movement of the robotic agent(s) 112, totes, item(s), and so forth. As discussed herein, the robotic agent(s) 112 and/or the workstation 110 may have sensor(s) (e.g., camera(s)) configured to capture or generate data. This data, for example, may include image data depicting empty slots on the shelves 114. In some instances, this image data may be transmitted to the remote computing resource(s) 102 for generating a task 118 to place a container within the empty slot and/or may be stored in the in-memory datastore 128. However, this is just one example, and the sensor(s) may collect additional data for use in optimizing throughput at the logistics center 106.

The management service 134 may be subscribed to, or receive, updates from the in-memory datastore 128. When updates are made to the in-memory datastore 128, such as status of the first robotic agent 112(1) completing a task, this information may be made available to the management service 134. For example, after the first robotic agent 112(1) picks a container off the shelf 114 and places the container on a conveyor for shipment, this information may be used for coordinating the future assignment of task(s) 118 to the first robotic agent 112(1). The first robotic agent 112(1) may, for example, place another container in the void spot on the shelf 114. Additionally, when states 130 of the robotic agents 112 or the task(s) 118 are updated, these states 130 may be used to trigger actions, such as performing additional task(s) 118. The states 130, or when updates of the state 130 are received, may be communicated with the remote computing resource(s) 102. This allows the remote computing resource(s) 102 to orchestrate the performance of additional task(s) 118 at the workstation 110 or other workstations 110. Moreover, such updates may be communicated to the remote computing resource(s) 102 for problem solving (e.g., when improper containers are picked or when tasks are not performed as instructed or expected).

In some instances, the remote computing resource(s) 102 may be implemented as one or more servers and may, in some instances form a portion of a network-accessible computing platform implemented as a computing infrastructure of processors, storage, software, data access, and so forth that is maintained and accessible via the network 108 such as the Internet. Cloud-based systems may not require end-user knowledge of the physical location and configuration of the system that delivers the services. Common expressions associated for the remote computing resource(s) 102 include "on-demand computing", "software as a service (SaaS)", "platform computing", "network-accessible platform", "cloud services", "data centers", and so forth.

As used herein, a processor, such as processor(s) 120 and/or 124 may include multiple processors and/or a processor having multiple cores. Further, the processor(s) may comprise one or more cores of different types. For example, the processor(s) may include application processor units, graphic processing units, and so forth. In one implementation, the processor(s)may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The computer-readable media 122 and/or 126 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
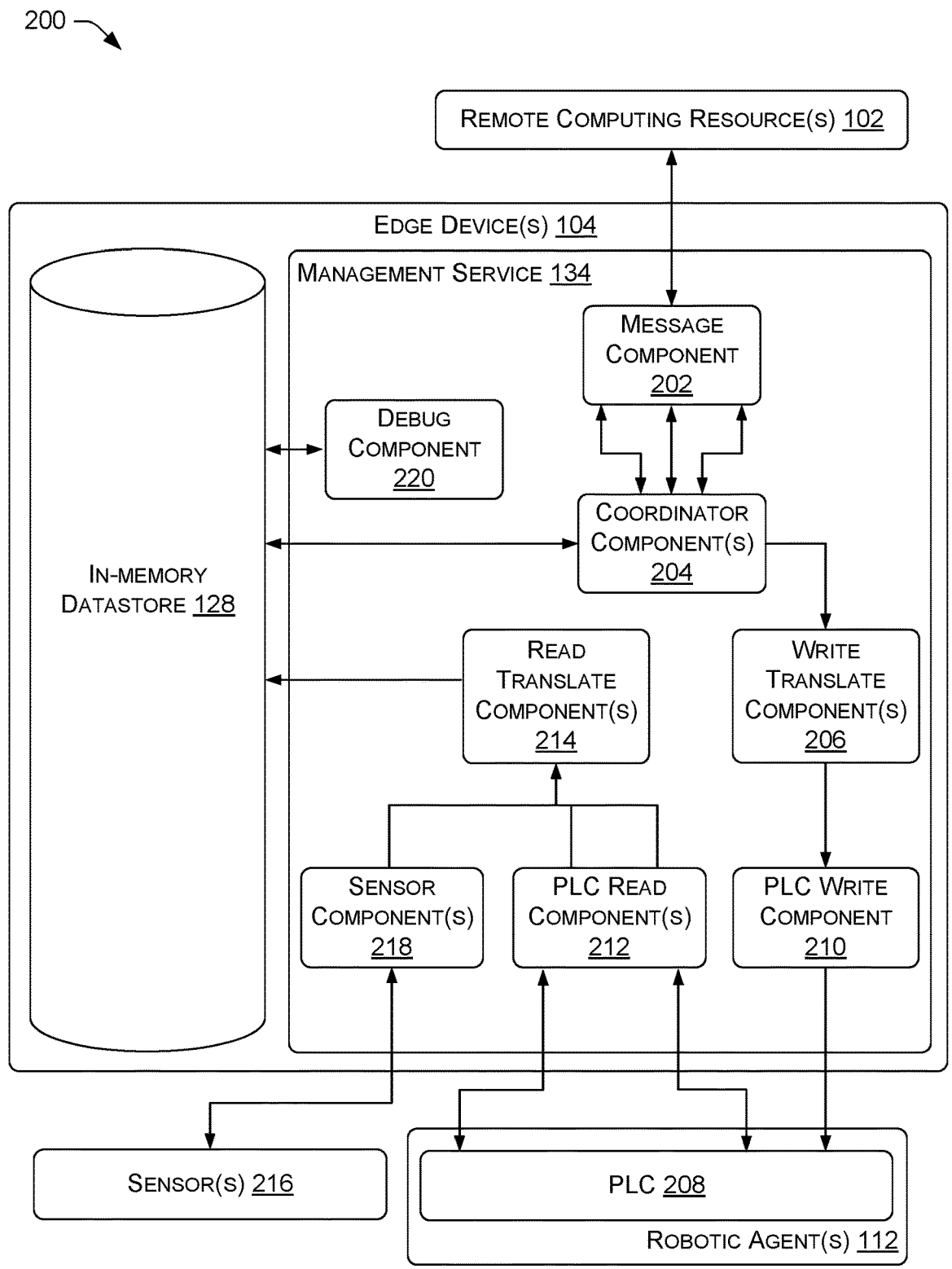
FIG. 2 illustrates an example system architecture for carrying out operations at a logistics center and/or storing information associated with task(s) performed at the logistics center.

FIG. 2 illustrates an example architecture 200 of the edge device(s) 104. As shown, the edge device(s) 104 may be in communication with the remote computing resource(s) 102 for receiving task(s) 118 to be performed by the robotic agent(s) 112. More particularly, the management service 134 may receive task(s) 118 from the remote computing resource(s) 102 and coordinate performance of the task(s)

118 with the robotic agent(s) 112. Additionally, as shown, the in-memory datastore 128 may be separate from the management service 134.

The management service 134 may represent software or an application running at the edge device(s) 104 and may include a message component 202 configured to receive messages from the remote computing resource(s) 102. The message(s) may include or be associated with task(s) 118, for example, moving a tote from one location to another within the logistics center 106, picking an item(s) from inventory, placing an item within the inventory, packing item(s), and so forth. In some instances, the edge device(s) 104 within the logistics center 106 that receives the messages 132 may be capable of causing the task(s) 1118 to be performed. For example, as the logistics center 106 may include more than one edge device(s) 104, the remote computing resource(s) 102 may communicate with an appropriate, or capable, edge device(s) 104 for causing the task 118 to be performed. In some instances, the message component 202 may correspond to a message queuing telemetry transport (MQTT) message broker for receiving messages 132 from the remote computing resource(s) 102 (or other devices) and routing the messages 132 to the appropriate destination, such as the appropriate robotic agent(s) 112.

A coordinator component(s) 204 of the management service 134 may coordinate the assignment of the task(s) 118 with the robotic agent(s) 112. For example, the coordinator component(s) 204 may select robotic agent(s) 112 for performing the task(s) 118. In some instances, the coordinator component(s) 204 may select the robotic agent(s) 112 based on location(s) associated with the task(s) 118, capabilities of the robotic agent(s) 112, specific(s) of the task(s) 118. (e.g., pick, place, package, etc.), availability, a state 130 of the robotic agent 112, a state 130 of the resource(s) (e.g., containers) used by the robotic agent 112 (e.g., picked up, transporting, etc.), a state of the workstation 110, and so forth.

In some instances, the coordinator component(s) 204 may be an application running on the edge device(s) 104 and include code that operates in response to receiving the messages 132. The coordinator component(s) 204 may automatically manage computing resource(s) of the edge device(s) 104 required by that code and processing the messages 132 or task(s) 118.

The management service 134 may further include write translate component(s) 206 for translating the assignment of the task(s) 118 into language understood or capable of being processed by the robotic agent(s) 112. For example, the robotic agents 112 may include a programmable logic controller (PLC) 208 which instructs or causes the robotic agents 112 to perform the task(s) 118. The PLC 208, for example, may effectuate or cause the robotic agents 112 to pick up item(s), pick up totes, place item(s) into totes, and so forth. As such, the write translate component(s) 206 may interpret the task(s) 118 for instructing the robotic agent(s) 112. In some instances, the write translate component(s) 206 may write specific instructions based on a device type, or language, of the robotic agent(s) 112. Additionally, the write translate component(s) 206 may be an application running on the edge device(s) 104 and include code that operates in response to receiving instructions for the task(s) 118. The write translate component(s) 206 may automatically manage computing resource(s) of the edge device(s) 104 required by the code and translating the task(s) 118.

A PLC write component 210 may transmit or write instructions for the robotic agent(s) 112 to perform the task(s) 118. For example, as shown in FIG. 2, the PLC write component 210 may be in communication with the write translate component(s) 206 and the PLC 208 for writing instructions onto the PLC 208 and causing the robotic agent(s) 112 to execute or otherwise perform the task(s) 118. The PLC write component 210 may act as an interface for communicating or writing the instruction(s) on the PLC 208.

A PLC read component(s) 212 may receive, or read, operations or instructions performed by the PLC 208 (or the robotic agent 112). For example, as part of the robotic agent 112 performing the task 118, the PLC 208 may store various information associated with the performance of the task 118 (e.g., movements, operations, times, resources used, etc.). The PLC read component(s) 212 may read or obtain this information from the PLC 208 for knowing a progress or status of the task 118 and/or the robotic agent(s) 112.

Although FIG. 2 illustrates the PLC write component 210 and the PLC read component(s) 212, the management service 134 may include other communication interfaces to communicate with the robotic agent(s) 112 for assigning or instructing of the task 118. Additionally, the edge device(s) 104 or the management service 134 may be in communication with other devices, sensor(s), or component(s) using the communication interfaces.

The management service 134 may include read translate component(s) 214 communicatively coupled to the PLC read component(s) 212. The read translate component(s) 214 may read operations or task(s) 118 performed by the PLC 208 (or the robotic agent 112) for translating into a data type or structure to be stored in the in-memory datastore 128. In some instances, this translation may be based at least in part on the device type of the robotic agent(s) 112. For example, as the in-memory datastore 128 supports simple strings, as well as more complex data structures, the read translate component(s) 214 may act as an interface between the PLC 208 and the in-memory datastore 128 for storing data. In some instances, the read translate component(s) 214 may modify data from the PLC 208 into key value pairs, text strings, hashes, lists, etc. for storing in the in-memory datastore 128.

In some instances, the read translate component(s) 214 may be an application running on the edge device(s) 104 and include code that operates in response to receiving operations or the task(s) 118 performed by the robotic agent(s) 112. The read translate component(s) 214 may automatically manage computing resource(s) of the edge device(s) 104 required by that code. In some instances, the read translate component(s) 214 may also determine the states 130 or the messages 132 for storing in the in-memory datastore 128.

As also shown, the read translate component(s) 214 may be in communication with sensor(s) 216 via a sensor component(s) 218. The sensor(s) 216 may be placed throughout the logistics center 106, such as on the robotic agent(s) 112, the shelves 114, ceiling, floor, etc. In some instances, the sensor(s) 216 may include imaging sensor(s), weight sensor(s), proximity sensor(s), or other types of sensor(s) for capturing or generating data associated with the logistics center 106. By way of example, a camera may be utilized to image a shelf within the logistics center 106 to recognize empty slots (e.g., rows and columns). As another example, a sensor may be used to determine a volume of item(s) in tote(s). The sensor(s) 216 may also image the logistics center 106 to locate personnel within the workstation(s) 110. In such instances, upon detecting personnel within the workstation 110, or within a working area of the robotic agent(s) 112, the robotic agent(s) 112 may be temporarily paused until the personnel leave. This may avoid injury to the personnel and/or damage to robotic agent(s) 112. The sensor component(s) 218 may read or receive data generated by the sensor(s) 216 for forwarding onto the read translate component(s) 214. In some instances, the sensor(s) 216 may be used for determining the state(s) 130, such as whether slots of a shelf 114 are empty or whether a robotic agent 112 is performing a task 118.

The in-memory datastore 128 is shown in communication with the coordinator component(s) 204. As updates are made to the in-memory datastore 128, the coordinator component(s) 204 may receive these updates. In such instances, the in-memory datastore 128 may have read and write capabilities for being implemented as a data cache, and may include compute capabilities. For example, when a robotic agent 112 completes a task 118, this information may be made available to the coordinator component(s) 204 for use coordinating the future assignment of task(s). By way of another example, the status of a slot or position on a shelf may be used for instructing a robotic agent 112 to place a container in the empty slot. In part, storing the in-memory datastore 128 locally at the edge device(s) 104 may increase processing time and reduce an amount of transmissions between the edge device(s) 104 and the remote computing resource(s) 102. However, in some instances, the updates of the robotic agents 112, the tasks 118, or the states may be communicated to the remote computing resource(s) 102 for resolving conflicts or assigning future tasks 118.

As introduced above with regard to FIG. 1, the in-memory datastore 128 may store or otherwise have access to, the states 130 and the messages 132. In some instances, the states 130 may represent a current state, condition, or mode of the robotic agent(s) 112 (e.g., busy, ready, under maintenance, off-line, on-line, etc.) or a current utilization of the shelves, or a slot on the shelves. For example, the states 130 may indicate a command state of the task(s) 118, or a status of command(s) (e.g., queued, written to PLC, received, in-flight, etc.) In some instances, the messages 132 may indicate communication(s) transmitted between the management service 134 and the robotic agent(s) 112, and/or data received from the sensor(s) 216.

In some instances, using in-memory datastore 128 may simplify code for performing application(s) operating on/for the management service 134 by enabling the code to be written in fewer lines of code, which in turn, requires less space for storing and less data to access. The in-memory datastore 128 may support language including Java, Python, PHP, C, C++, C #, JavaScript, Node.js, Ruby, R, Go and many others. The in-memory datastore 128 may also perform atomic updates to allow the execution of a group of commands in a single step. For example, robotic agent(s) 112 at the workstation 110 may be dependent on the same data or the state 130 of a task 118. The in-memory datastore 128 allows for an atomic update to the state 130, for example, such that all robotic agent(s) 112 are operating with, or have access to, the same or consistent data. With atomic updates, the in-memory datastore 128 allows for complete updates such that the edge device(s) 104 have access to consistent data.

The management service 134 may further include debug component(s) 220, which may provide operators with the ability to diagnose problem(s) for increasing throughput within the logistics center 106. For example, an operator at the logistics center 106 may transmit a request to the management service 134 to supply messages 132 between the management service 134 and the first robotic agent 112(1). Such information may provide the personnel with the ability to diagnose or solve issues experienced (e.g., incomplete task(s) 118). Additionally, in some instances, the debug component(s) 220 may automatically perform debugging operation(s) to resolve issue(s). Results of the debugging operation(s) may be sent to the remote computing resource(s) 102 via the coordinator component(s) 204.

In some instances, the debug component(s) 220 may be an application running on the edge device(s) 104 that has code which operates in response to problems experienced by the management service 134. The debug component(s) 220 may automatically manage computing resource(s) of the edge device(s) 104 required by that code for performing debugging operations. The debug component(s) 220 may be configured to perform various operations associated with the data stored in the in-memory datastore 128. For example, the debug component(s) 220 may handle requests for creating data, reading data, deleting data, and/or updating data within the in-memory datastore 128. As part of this process, the in-memory datastore 128 may respond to requests given the compute capabilities of the in-memory datastore 128

Figure 3:
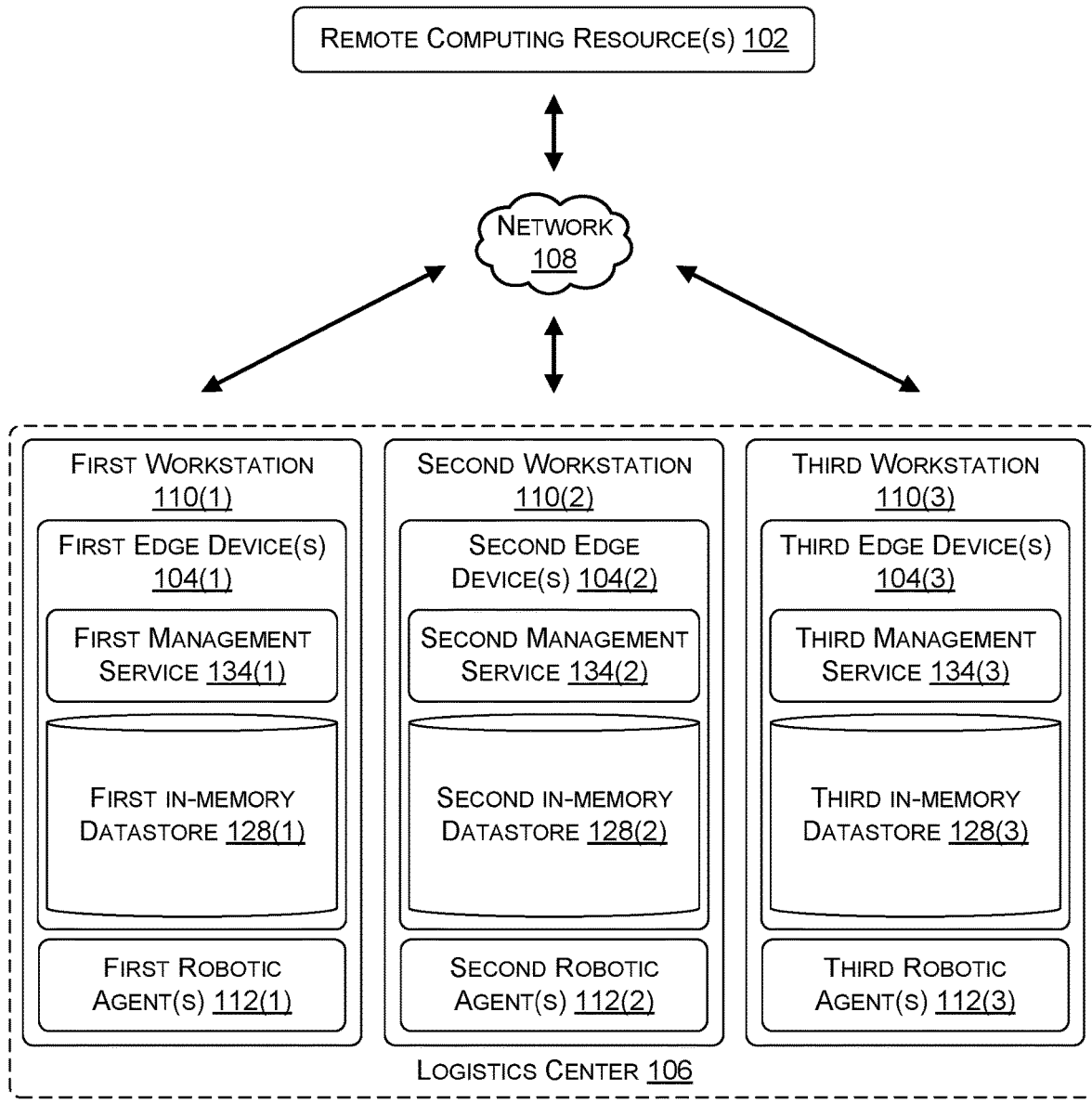
FIG. 3 illustrates an example component diagram of workstations and edge device(s) within an logistics center.

FIG. 3 illustrates an example environment 300, showing the remote computing resource(s) 102 in communication with multiple edge device(s) 104 associated with respective workstation(s) 110 within the logistics center 106. For example, the remote computing resource(s) 102 may be in communication, via the network 108, with first edge device(s) 104(1) associated with a first workstation 110(1), second edge device(s) 104(2) associated with a second workstation 110(2), and third edge device(s) 104(3) associated with a third workstation 110(3). As illustrated, the first workstation 110(1), the second workstation 110(2), and the third workstation 110(3) may be physically located in the logistics center 106, remote from the remote computing resource(s) 102.

The first edge device(s) 104(1) may coordinate the performance of task(s) 118 received from the remote computing resource(s) 102 at the first workstation 110(1), the second edge device(s) 104(2) may coordinate the performance of task(s) 118 received from the remote computing resource(s) 102 at the second workstation 110(2), and the third edge device(s) 104(3) may coordinate the performance of task(s) 118 received from the remote computing resource(s) 102 at the third workstation 110(3). The first edge device(s) 104(1), the second edge device(s) 104(2), and the third edge device(s) 104(3) may be provisioned separately for each of the first workstation 110(1), the second workstation 110(2), and the third workstation 110(3), respectively.

The first edge device(s) 104(1) may include, or have access to, a first management service 134(1) that instructs first robotic agent(s) 112(1) to perform the task(s) 118 at the first workstation 110(1) and as received from the remote computing resource(s) 102. The second edge device(s) 104 (2) may include, or have access to, a second management service 134(2) that instructs second robotic agent(s) 112(2) to perform the task(s) 118 at the second workstation 110(2) and as received from the remote computing resource(s) 102. The third edge device(s) 104(3) may include, or have access to, a third management service 134(3) that instructs third robotic agent(s) 112(3) to perform the task(s) 118 at the third workstation 110(3) and as received from the remote computing resource(s) 102. In some instances, each of the first workstation 110(1) (or the first robotic agent(s) 112(1)), the second workstation 110(2) (or the second robotic agent(s) 112(2)), and/or the third workstation 110(3) (or the third robotic agent(s) 112(3)) may include respective task(s) they are configured to perform, or capable of performing. As such, the first edge device(s) 104(1) may control, instruct, or be in communication with one or more of the first robotic agent(s) 112(1), the second edge device(s) 104(2) may control, instruct, or be in communication with one or more of the second robotic agent(s) 112(2), and the third edge device(s) 104(3) may control, instruct, or be in communication with one or more of the third robotic agent(s) 112(3).

The first management service 134(1) runs alongside a first in-memory datastore 128(1) stored in memory of the first edge device(s) 104(1), the second management service 134(2) runs alongside a second in-memory datastore 128(2) stored in memory of the second edge device(s) 104(2), and the third management service 134(3) runs alongside a third in-memory datastore 128(3) stored in memory of the third edge device(s) 104(3). Each of the first in-memory datastore 128(1), the second in-memory datastore 128(2), and the third in-memory datastore 128(3) may represent separately provisioned in-memory datastores provisioned on the first edge device(s) 104(1), the second edge device(s) 104(2), and the third edge device(s) 104(3), respectively. As discussed above, and by way of illustration, the first in-memory datastore 128(1) may store communication(s) between the first edge device(s) 104(1) (or the first management service 134(1)) and the remote computing resource(s) 102, the task(s) 118 performed at the first workstation 110(1) or by the first robotic agent(s) 112(1), information associated with the task(s) 118, such as a time task(s) 118 are received, a time the task(s) 118 are completed, times associated with the performance of the task(s) 118 (e.g., picking up item(s), placing item(s), dropping off item(s), etc.), containers utilized by the first robotic agent(s) 112(1), states 130 of the first robotic agent 112(1), etc. The second in-memory datastore 128(2) and the third in-memory datastore 128(3) may store similar information.

Additionally, although the logistics center 106 is shown including three workstation(s) 110, the logistics center 106 may include less than, or more than, three workstation(s) 110. The computer-readable media 122 of the remote computing resource(s) 102 may store, or have access to, information of those edge device(s) 104 provisioned across the workstation(s) 110 within the logistics center 106, as well as those robotic agent(s) 112 controlled by the respective edge device(s) 104 across the workstation(s) 110. In some instances, the first workstation 110(1), the second workstation 110(2), or the third workstation 110(3) may be in communication with one another or may not be in communication with one another.

In some instances, the first edge device(s) 104(1), the second edge device(s) 104(2) and/or the third edge device(s) 104(3) may receive JavaScript Object Notation (JSON) messages from the remote computing resource(s) 102. Moreover, the component(s) of the management service 134 may communicate with JSON messages. Additionally, components of the first edge device(s) 104(1), the second edge device(s) 104(2), and/or the third edge device(s) 104(3) may communicate in JSON messages.

Figure 4:
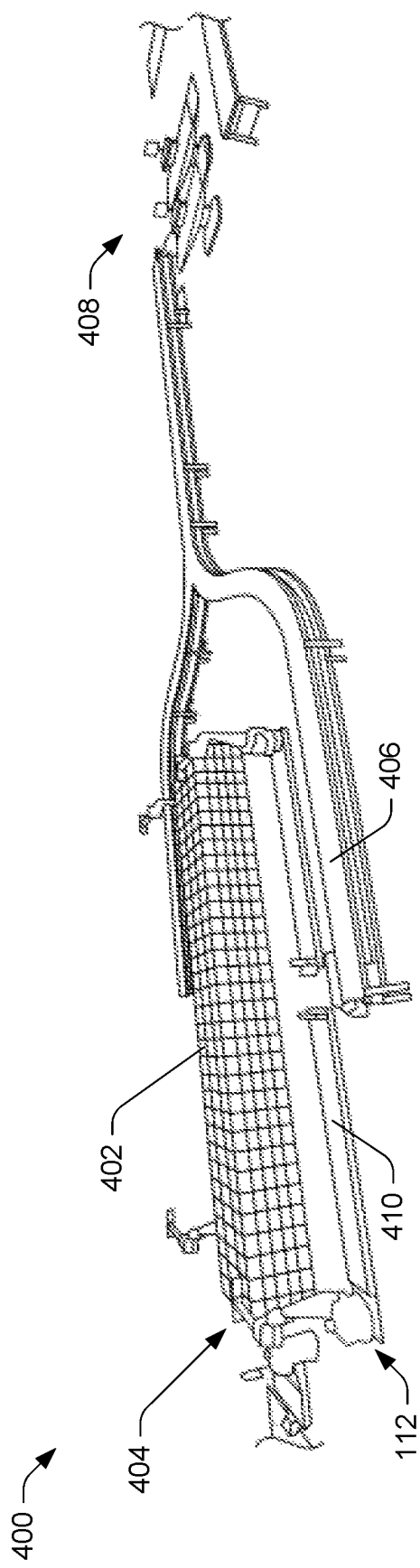
FIG. 4 illustrates an example workstation within a logistics center where item(s) are picked, sorted, inducted, or packaged for shipment.

FIG. 4 illustrates an example workstation 400 within the logistics center 106. In some instances, the workstation 400 may include several robotic agent(s) 112 having end effectors for picking containers 402 from shelves 404. As shown, the shelves 404 may be disposed between robotic agent(s) 112 on one side of the workstation 400 and robotic agent(s) 112 on another side of the workstation 400. After item(s) are picked, or otherwise arrive at the workstation 400, the item(s) may be placed in the containers 402. After item(s) of an order are placed into the containers 402, and the order is fulfilled, the robotic agents 112 may receive task(s) to remove the containers 402 and place the containers 402 on conveyors 406. In some instances, human agents may place the item(s) into the container(s) and then place the containers 402 onto the shelves 404. The conveyors 406 may convey the containers 402 to packing stations 408 whereby the item(s) are removed from the containers 402 and placed into boxes, envelopes, or other carriers for shipment. The packages may then travel to ejection sites to be readied for shipment. During the packing process, however, the containers 402 may accumulate at the packing stations 408. The emptied containers 402 may be delivered back to the workstation 400 via human or robotic agents (e.g., container mover), for example. Therein, the robotic agent 112 may pick the emptied containers 402 and place the containers 402 on the shelves 404 for filling by the human agent. To traverse or move along a length of the shelves 404, the robotic agents 112 may be disposed on slides 410 that laterally move along a length of the shelves 404.

At the workstation 400, the robotic agent(s) 112 require knowledge of those empty slots on the shelves 404 (e.g., row and column) for placing containers 402. Additionally, the robotic agent(s) 112 require knowledge of the slots for picking item(s) ready for shipment and placement onto the conveyors 406. The robotic agent(s) 112 or the logistics center 106 may include sensor(s) 216 for scanning identifiers (e.g., barcode) of the containers 402 and/or slots within the shelves 404. This may ensure that proper containers 402 are picked and/or containers 402 are replaced at proper positions on the shelves 404.

Figure 5:
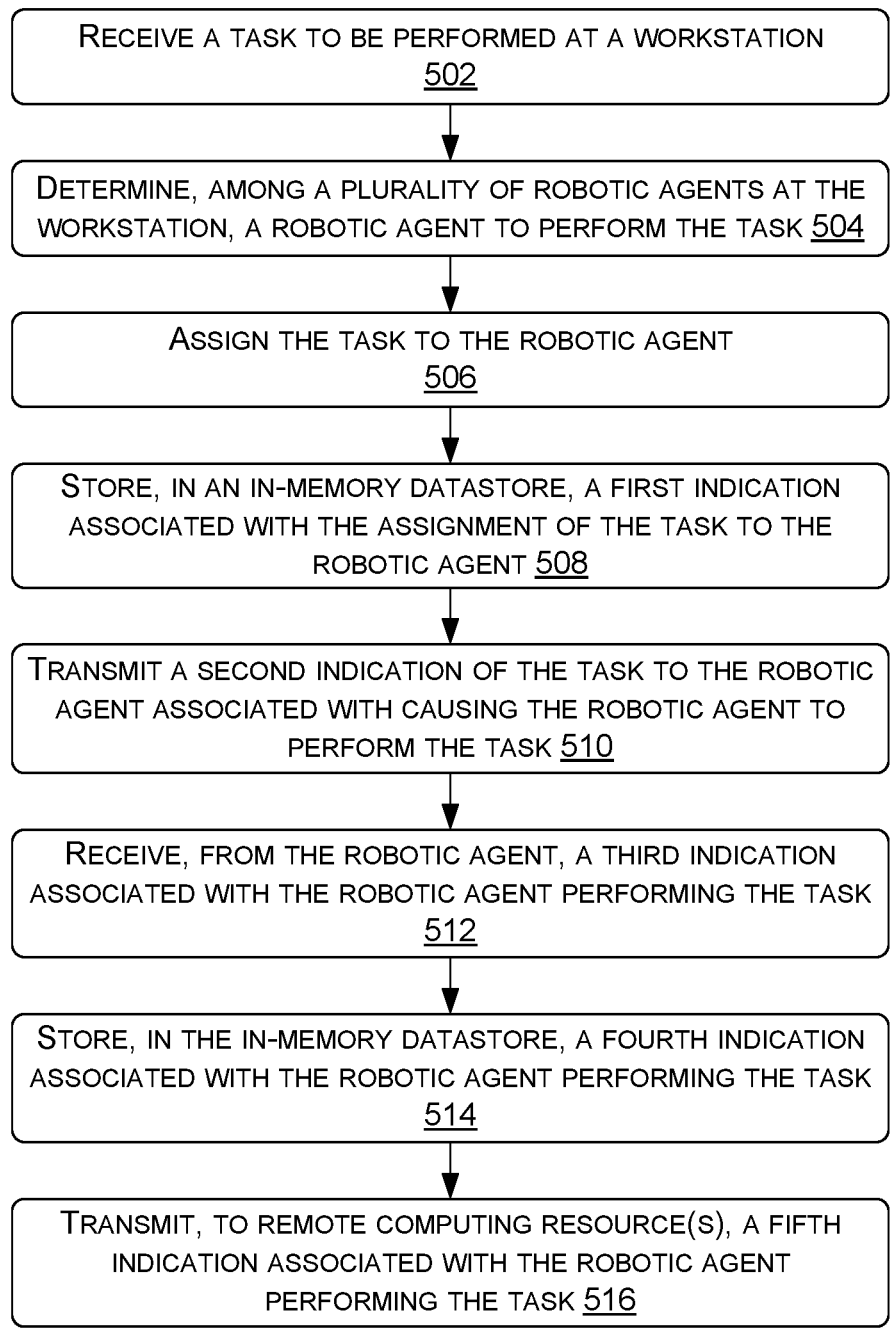
FIG. 5 illustrates an example process for receiving task(s) to be performed at a workstation within a logistics center, and storing information within an in-memory datastore.
Figure 6:
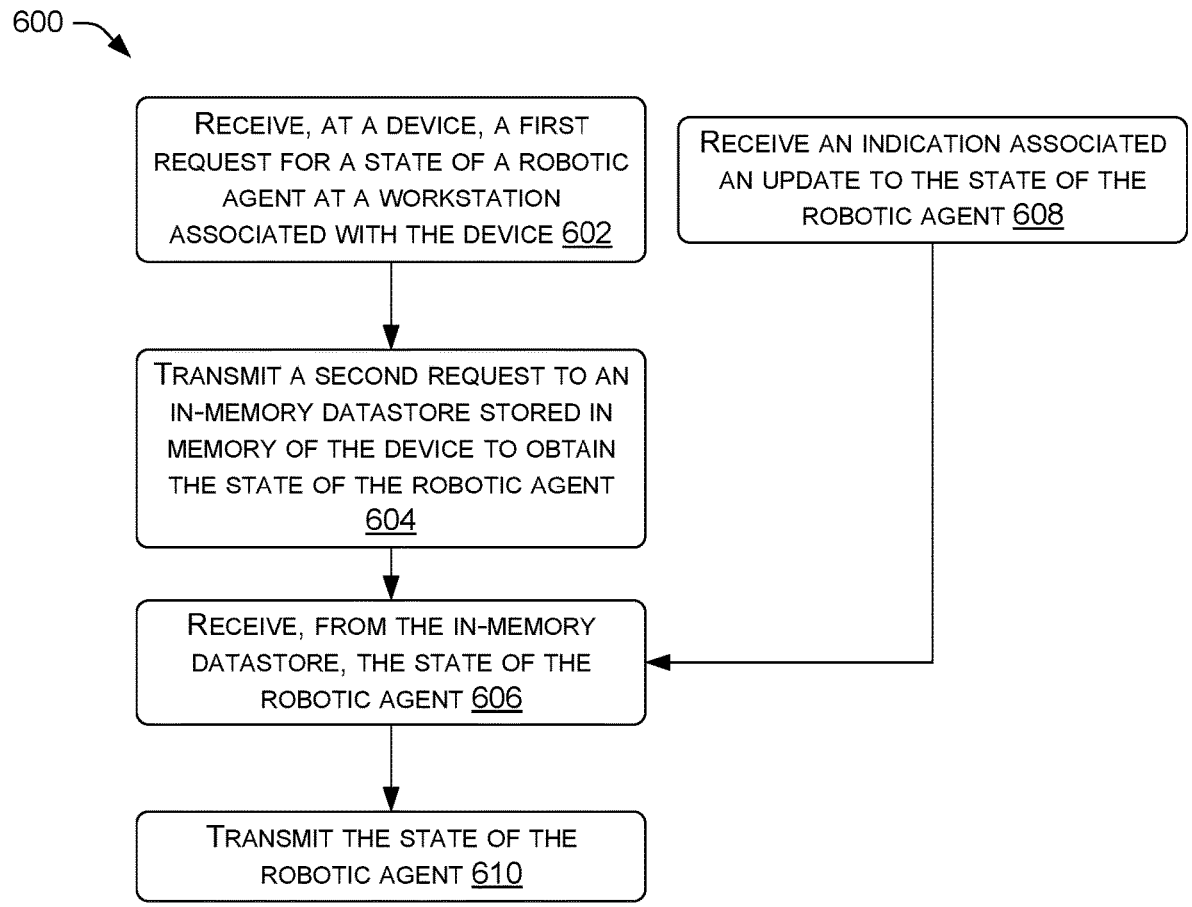
FIG. 6 illustrates an example process for processing requests associated with obtaining states of robotic agent(s) at a workstation within a logistics center.
Figure 7:
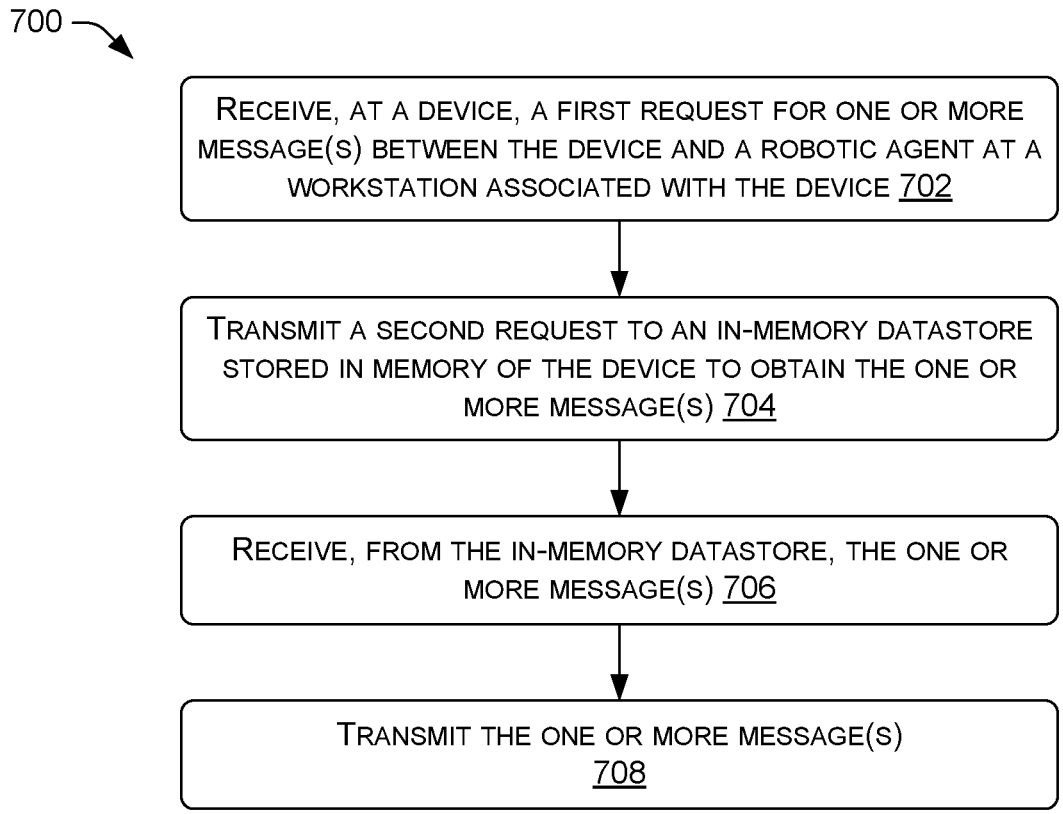
FIG. 7 illustrates an example process for processing requests associated with obtaining message(s) between edge device(s) and robotic agent(s) at a workstation within a logistics center.

FIGS. 5-7 illustrate various processes related to increasing a throughput between edge device(s) 104 and remote computing resource(s) 102, and utilizing an in-memory datastore 128 for storing information at the edge device(s) 104. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

FIG. 5 illustrates an example process 500 for assigning task(s) 118 and storing information in an in-memory datastore 128. At 502, the process 500 may receive a task to be performed at a workstation. For example, the management service 134 operating on the edge device(s) 104 may receive, from the remote computing resource(s) 102, a task 118 to be performed at the workstation 110. In some instances, the message component 202 of the management service 134 operating on the edge device(s) 104 may receive indications of the task(s) 118 to be performed at the workstation 110. By way of example, the task 118 may relate to replacing a container on an empty slot (column/row) on a shelf.

At 504, the process 500 may determine, among a plurality of robotic agent at the workstation, a robotic agent to perform the task. For example, upon receipt of the task 118 from the remote computing resource(s) 102, the coordinator component(s) 204 of the management service 134 may determine a robotic agent 112 to perform the task 118. As the workstation 110 may have a plurality of robotic agent(s) 112, the coordinator component(s) 204 may determine a suitable or best-suited robotic agent 112 to perform the task 118. In some instances, this decision may be based at least in part on capabilities of the robotic agent(s) 112, a location of the robotic agent(s) 112, location(s) associated with the task 118, states 130 of the robotic agent(s) 112 (e.g., busy, stand-by, etc.), and so forth. Moreover, the coordinator component(s) 204 may be in communication with the in-memory datastore 128 stored in-memory of the edge device(s) 104 for determining the states 130 or status of the robotic agent(s) 112, or information associated with the logistics center 106. Such information may additionally, or alternatively, be utilized when assigning the task 118 to the robotic agent 112.

At 506, the process 500 may assign the task to the robotic agent. For example, based at least in part on determining or selecting the robotic agent 112 to perform the task 118, the coordinator component(s) 204 may assign the task 118 to the robotic agent 112. In some instances, the assignment may be associated with an identifier, or request identifier, for identifying the task 119 and/or monitoring the task 118.

At 508, the process 500 may store, in an in-memory datastore, a first indication associated with the assignment of the task to the robotic agent. For example, the coordinator component(s) 204 may transmit an indication to the in-memory datastore 128 associated with the assignment of the task 118 to the robotic agent 112. In some instances, however, the coordinator component(s) 204 may otherwise cause an indication associated with the assignment of task 118 to be stored in the in-memory datastore 128. In some instances, the indication may include, or be associated with, a time the task 118 was received from the remote computing resource(s), a time the task 118 was assigned to the robotic agent 112, an identifier of the robotic agent 112, an identifier of equipment assignment with the task 118 (e.g., container), identifier(s) of location(s) associated with the task 118, and so forth.

At 510, the process 500 may transmit a second indication of the task to the robotic agent associated with causing the robotic agent to perform the task. For example, the coordinator component(s) 204 may cause the write translate component(s) 206 and/or the PLC write component 210 to instruct (e.g., write) the PLC 208 of the robotic agent 112 to complete the task 118. In some instances, the instructions or indications may include a series of ordered steps or operations to perform the task 118. In some instances, the instructions sent to the robotic agent 112 to perform the task 118 may be stored in the in-memory datastore 128.

At 512, the process 500 may receive, from the robotic agent a third indication associated with the robotic agent performing the task. For example, the PLC read component(s) 212 and/or the read translate component(s) 214 may receive, from the robotic agent 112, indications associated the robotic agent 112 performing the task 118. In some instances, the PLC read component(s) 212 and/or the read translate component(s) 214 may additionally, or alternatively, receive status update(s) associated with the robotic agent 112 performing the task 118 (i.e., during performance of the task 118). The indication(s) may include, identifiers of the robotic agent 112, container(s) used, or other information associated with the performance of the task 118. Such information may be stored in association with the task 118 in the in-memory datastore 128.

At 514, the process 500 may store, in the in-memory datastore, a fourth indication associated with the robotic agent performing the task. For example, the management service 134 or the read translate component(s) 214 may store indications in the in-memory datastore 128 associated with the robotic agent 112 and/or the robotic agent 112 completing the task 118. Storing such information in the in-memory datastore 128 may be used for the future assignment of task(s) at the workstation 110. That is, the information stored in the in-memory datastore 128 may indicate state(s) 130 of the robotic agent(s) 112, the workstation 110, etc., and such information may be used by the coordination component(s) assigning task(s) 118. For example, the state 130 of the robotic agent 112, upon completing the task, may update from busy to ready. This may allow the coordinate component(s) 204 to schedule another task 118 to the robotic agent 112.

At 516, the process 500 may transmit a fifth indication to remote computing resource(s) associated with the robotic agent performing the task. For example, after storing an indication in the in-memory datastore 128 associated with the robotic agent 112 performing the task, the management service 134 may cause an indication to be sent to the remote computing resource(s) 102 associated with the robotic agent 112 performing the task 118. In some instances, the indication sent to the remote computing resource(s) 102 may be used for the future assignment of task(s) 118, to update a status or state of the robotic agent 112, and so forth.

Although the process 500 illustrates the assignment of a single task to a robotic agent 112, the process 500 or coordinator component(s) 204 may assignment, consecutively or in parallel, a plurality of task(s) 118 to a single robotic agent 112 or a plurality of robotic agents 112 at the workstation 110. Additionally, upon performance of the task, whether successful or not, indications or updates may be sent to the remote computing resource(s) 102 for orchestrating the performance of additional tasks 118 and/or problem solving issues at the workstation 110.

FIG. 6 illustrates an example process 600 for receiving a request associated with a state 130 of a robotic agent 112 at a workstation 110.

At 602, the process 600 may receive, at a device, a first request for a state of a robotic agent at a workstation associated with the device. For example, the edge device(s) 104 (or the message component 202) may receive, from the remote computing resource(s) 102, a request associated with the state 130 of the robotic agent 112. In some instances, the coordinator component(s) 204 coupled to the message component 202 may determine how to process the request, decipher the request, and so forth, for obtaining the state 130 associated with the robotic agent 112. In some instances, the request may be received in response to personnel requesting the state 130 or the remote computing resource(s) 102 may transmit the request for determining the state 130 and for use in assigning task(s) 118.

At 604, the process 600 may transmit a second request to an in-memory datastore stored in memory of the device to obtain the state of the robotic agent. For example, the coordinator component(s) 204 may transmit a request to the in-memory datastore 128 for obtaining the state 130 of the robotic agent 112. In some instances, however, rather than transmitting the request, the coordinator component(s) 204 may receive updates from the in-memory datastore 128 when states 130 of the robotic agent 112 are updated or otherwise changed. In some instances, this may trigger the coordinator component(s) 204 to transmit, via the message component 202, the state 130 to the remote computing resource(s) 102.

At 606, the process 600 may receive, from the in-memory datastore, the state of the robotic agent. In some instances, the coordinator component(s) 204 may receive the state 130 from the in-memory datastore 128, where the state 130 indicates current or past states 130 of the robotic agent 112. Moreover, in addition to providing the states 130, the states 130 may indicate a time stamp associated with the states 130, or when the states 130 were received, determined, or stored in the in-memory datastore 128.

Additionally, FIG. 6 illustrates that the process 600 may proceed to 606 from 608. For example, at 608, the process 600 may receive an indication associated with an update to the state of the robotic agent. The indication may be received, from example, following completion of a task 118 by the robotic agent 112. That is, upon completion of the task 118, the coordinator component(s) 204 may receive an indication of such. Therein, the coordinator component(s) 204 may inquire about the state 130 of the robotic agent 112 and/or may otherwise receive information about the state 130 of the robotic agent 112. However, in some instances, the coordinator component(s) 204 may automatically cause the update and/or the state 130 to be transmitted to the remote computing resource(s) 102.

At 610, the process 600 may transmit the state of the robotic agent 112. For example, the coordinator component(s) 204 may coordinate or communicate with the message component 202 for transmitting the states 130 (i.e., data) to the remote computing resource(s) 102. In some instances, in response, the remote computing resource(s) 102 may utilize the states 130 for diagnosing problems at the robotic agent 112, or the workstation 110, performing diagnostics, or assigning future task(s) 118.

Although the process 600 illustrates processing a request for a single robotic agent 112, the coordinator component(s) 204 may process a plurality of request(s) from the remote computing resource(s) 102 for states 130 of a plurality of robotic agent(s) 112 at the workstation 110. Additionally, rather than requesting states 130 of the robotic agent(s) 112, the remote computing resource(s) 102 may request state(s) 130 of other equipment or hardware in the logistics center 106. For example, the requests may be associated with determining a state of a slot within a shelf (e.g., empty, paused, filled), a state of a container (e.g., full, empty, etc.), and so forth. In some instances, the state 130 may indicate that a container contains item(s) that were to be packaged, but were unsuccessfully packaged at the packing station. Still, in some instances, the requests may be associated with obtaining sensor data from the sensor(s) 216. In some instances, the states 130 of the robotic agent(s) 112, or of the logistics center 106, may be determined based at least in part on the sensor data generated by the sensor(s) 216. Moreover, rather than requesting or obtaining information about the state of the robotic agent 112, state(s) of the task 118 (e.g., progress, completion, failed, etc.) may be received and transmitted.

FIG. 7 illustrates an example process 700 for receiving a request associated with obtaining one or more messages 132 associated with a robotic agent 112 at a workstation 110. In some instances, the example process 700 may be performed for debugging purposes, such as when task(s) 118 are not being completed and/or are being improperly completed.

At 702, the process 700 may receive, at a device, a first request for one or message(s) between the device and a robotic agent at a workstation associated with the device. For example, the edge device(s) 104 (or the message component 202) may receive, from the remote computing resource(s) 102, a request associated within obtaining messages 132 exchanged between the management service 134 and the robotic agent(s) 112. In some instances, the coordinator component(s) 204 coupled to the message component 202 may determine how to process the request, decipher the request, and so forth, for obtaining the messages 132 associated with the robotic agent 112.

At 704, the process 700 may transmit a second request to an in-memory datastore stored in memory of the device to obtain the one or more messages 132. For example, the coordinator component(s) 204 may transmit a request to the in-memory datastore 128 for obtaining the messages 132. In some instances, the request may be associated with receiving message(s) over a certain period of time (e.g., previous minute, hour, etc.), for a certain task 118, or within a certain robotic agent 112. The request may also identify the robotic agent(s) (e.g., via a robotic agent identifier) or a task 118 of the robotic agent 112 (e.g., via a task identifier, type of request associated with the task 118, such as pick, place, move, etc.).

At 706, the process 700 may receive, from the in-memory datastore, the one or more message(s). For example, the coordinator component(s) 204 may receive the messages 132 from the in-memory datastore 128, where the messages 132 correspond to communications between the management service 134 and the robotic agent 112. In some instances, the messages 132 may correspond to messages 132 received from the remote computing resource(s) 102 for performing a certain task, communications transmitted to the robotic agent 112 (or the PLC 208) for performing the task(s) 118, communications transmitted from the robotic agent 112 in association with performing the task(s) 118, etc. For example, as part of the robotic agent 112 completing a task 118, the robotic agent 112 may transmit a message to the management service 134 indicating such. The messages 132 may also be associated with time(s), location(s), identifier(s), and so forth. In some instances, the messages 132 may be in JSON.

At 710, the process 700 may transmit the one or more messages. For example, the coordinator component(s) 204 may coordinate or communicate with the message component 202 for transmitting the one or more messages 132 (i.e., data) to the remote computing resource(s) 102. In some instances, in response, the remote computing resource(s) 102 may use the messages 132 for deciphering or providing insight into the task(s) 118, increasing performance at the workstation, or problem solving issues experienced at the workstation 110.

Although the process 700 illustrates processing a single request for obtaining messages 132, the coordinator component(s) 204 may process a plurality of request(s) from the remote computing resource(s) 102 for messages 132 of a plurality of robotic agent(s) 112 at the workstation 110.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A system comprising:
one or more processors;
one or more non-transitory computer-readable media; and
an in-memory datastore stored in the one or more non-transitory computer-readable media, the in-memory datastore storing information associated with a state of a plurality of robotic agents at a workstation within an environment in which orders for items are fulfilled, wherein individual robotic agents of the plurality of robotic agents are stored in association with one or more tasks that the individual robotic agents are configured to perform at the workstation;
wherein the one or more non-transitory computer-readable media store computer-executable instructions that, when executed by the one or more processors, cause the one or more processors to perform operations comprising:
receiving, from a remote computing resource, a request for performing a task at the workstation;
determining, among the plurality of robotic agents at the workstation, a robotic agent to perform the task;
assigning the task to the robotic agent;
storing, in the in-memory datastore, a first indication associated with assigning the task to the robotic agent;
sending, to the robotic agent, an instruction associated with the robotic agent performing the task, wherein the robotic agent is configured to perform the task based at least in part on the instruction;
receiving, from the robotic agent, a second indication associated with the robotic agent performing the task; and
storing, in the in-memory datastore, a third indication associated with the robotic agent performing the task, wherein the third indication identifies at least one of:
a first identifier of the robotic agent;
a second identifier of the task; or
one or more resources within the environment utilized by the robotic agent to perform the task.

2. The system of claim 1, wherein the first indication identifies at least one of:
a second time associated with receiving the request from the remote computing resource;
a third time associated with assigning the task to the robotic agent; or
the instruction associated with the robotic agent performing the task.

3. The system of claim 1, the operations further comprising:
receiving, from the remote computing resource, a second request for a state of the robotic agent, wherein the state is associated with a current performance of the robotic agent or a previous performance of the robotic agent; and
transmitting, to the remote computing resource, the state of the robotic agent.

4. The system of claim 1, the operations further comprising receiving, from the remote computing resource, a second request for one or more messages exchanged between the system and the robotic agent, the one or more messages identifying at least one of:
the instruction sent to the robotic agent;
a time associated with the robotic agent performing the task; or
one or more actions performed by the robotic agent to perform the task.

5. A method comprising:
receiving, at a local device and from a remote device, a first indication of a task to be performed at a workstation within an environment, wherein the remote device is physically remote from the local device;
determining, by the local device, a robotic agent at the workstation configured to perform the task;
storing, in an in-memory datastore at the local device, first data associated with the task and the robotic agent to perform the task;
sending, to the robotic agent, a second indication associated with the robotic agent performing the task;
receiving, from the robotic agent, a third indication associated with a performance of the task; and
storing, in the in-memory datastore, second data associated with the third indication.

6. The method of claim 5, further comprising:
accessing the in-memory datastore to obtain a current state of the robotic agent; and
determining, based at least in part on the current state, to assign the task to the robotic agent,
wherein sending the second indication is based at least in part on assigning the task to the robotic agent.

7. The method of claim 5, wherein the second data identifies at least one of:
a first time the robotic agent performed the task;
a second time the robotic agent received the second indication;
a first identifier of the task;
a second identifier of the robotic agent; or
one or more resources at the workstation utilized by the robotic agent.

8. The method of claim 5, further comprising:
receiving, at the local device from the remote device, a fourth indication requesting information associated with the robotic agent performing the task; and
sending at least a portion of the second data to the remote device.

9. The method of claim 5, further comprising sending, from the local device to the remote device, at least one of:
a current performance state of the robotic agent;
a previous performance state of the workstation;
a first previous task performed by the robotic agent;
a second previous task performed at the workstation by the robotic agent;
a first time associated with the first previous task performed by the robotic agent; or
a second time associated with the second previous task performed at the workstation.

10. The method of claim 5, wherein the task is associated with the robotic agent, further comprising:
causing the robotic agent to remove a first container containing an item from a slot on a shelf;
causing the robotic agent to place the first container for transport; and
causing the robotic agent to place a second container into the slot.

11. The method of claim 10, wherein the second data identifies at least one of:
a first identifier of the slot;
a second identifier of the first container;
a third identifier of the second container;
a first time associated with the robotic agent removing the first container from the slot;
a second time associated with the robotic agent placing the first container for transport; or
a third time associated with the robotic agent placing the second container into the slot.

12. The method of claim 5, further comprising:
storing, in the in-memory datastore, one or more messages transmitted between the local device and the robotic agent, wherein the one or more messages are stored in association with a time of receipt; and
sending, from the local device to the remote device, the one or more messages.

13. The method of claim 5, further comprising:
receiving, at the local device and from the remote device, a fourth indication of a second task to be completed at the workstation;
causing the second task to be queued, wherein the second task is configured to be performed after the task;
storing, in the in-memory datastore, third data associated with the second task being queued;
causing an instruction to be written on a programmable logic controller (PLC) of the robotic agent for carrying out the second task;
storing, in the in-memory datastore, fourth data associated with the instruction being written on the PLC;
receiving a fifth indication associated with the robotic agent receiving the second task; and
storing, in the in-memory datastore, fifth data associated with the robotic agent receiving the second task.

14. A device comprising:
one or more processors;
one or more non-transitory computer-readable media; and
an in-memory datastore stored in the one or more non-transitory computer-readable media, the in-memory datastore storing information associated with one or more robotic agents located at a workstation within an environment,
wherein the one or more non-transitory computer-readable media store computer-executable instructions that, when executed by the one or more processors, cause the one or more processors to perform operations comprising:
receiving, from a remote device, a first indication of a task to be performed by a robotic agent of the one or more robotic agents;
assigning the task to the robotic agent;
storing a second indication in the in-memory datastore associated with assigning the task to the robotic agent;
causing an instruction associated with performing the task to be sent to the robotic agent;
receiving, from the robotic agent, a third indication associated with a performance of the task; and
causing a fourth indication associated with the performance of the task to be stored in the in-memory datastore.

15. The device of claim 14, wherein the third indication includes one or more instructions associated with the robotic agent performing the task, the operations further comprising storing, in the in-memory datastore:
the instruction;
a time associated with the instruction being sent to the robotic agent;
a first identifier of the task; and
a second identifier of the robotic agent.

16. The device of claim 14, the operations further comprising:
receiving, from the remote device, a fifth indication requesting a state of the task;
receiving, from the in-memory datastore, the state, wherein the state corresponds to at least one of:
a progress of the task;
a status of the robotic agent performing the task; or
a stage associated with assigning the task to the robotic agent; and
sending, to the remote device, data associated with the state.

17. The device of claim 14, the operations further comprising receiving, from the remote device, a fifth indication requesting one or more messages exchanged between the device and the robotic agent, the one or more messages identifying at least one of:
the instruction sent to the robotic agent;
a first time associated with the robotic agent performing the task;
one or more actions performed by the robotic agent in performing the task; or
a second time associated with the one or more actions performed by the robotic agent.

18. The device of claim 14, the operations further comprising:
receiving, from one or more sensors, image data depicting at least a portion of the workstation;
storing, in the in-memory datastore, the image data in association with a time at which the image data was generated; and
at least one of:
determining, based at least in part on the image data, a second task to perform or a modification to the task; or
sending, to the remote device, the image data.

19. The device of claim 14, the operations further comprising:
receiving a fifth indication associated with a container utilized by the robotic agent to perform the task; and
storing, in the in-memory datastore, an identification of the container and at least one of:
a first time at which the robotic agent picked up the container, or
a second time at which the robotic agent dropped off the container.

20. The device of claim 14, the operations further comprising:
receiving, from the in-memory datastore, a state of the robotic agent that is associated with the performance of the task;
determining, based at least in part on the state of the robotic agent, a second task for the robotic agent; and
causing a second instruction associated with the second task to be sent to the robotic agent.

* * * * *